United States Patent [19]

Kirby et al.

[11] 4,021,785

[45] May 3, 1977

[54] INTERFACE SYSTEM FOR A COMPUTER TERMINAL AND RANDOM ACCESS SLIDE PROJECTOR

[75] Inventors: Paul J. Kirby, Mountain View, Calif.; Edward M. Gardner, Denver, Colo.

[73] Assignee: The United States of America as represented by the Secretary of the Air Force, Washington, D.C.

[22] Filed: Sept. 17, 1975

[21] Appl. No.: 614,273

[52] U.S. Cl. .......................................... 340/172.5
[51] Int. Cl.² .......................................... G06F 1/00
[58] Field of Search .................. 340/172.5; 353/25

[56] References Cited

UNITED STATES PATENTS

| | | | |
|---|---|---|---|
| 3,566,370 | 2/1971 | Worthington | 340/172.5 |
| 3,585,597 | 6/1971 | Holmerud | 340/172.5 |
| 3,596,253 | 7/1971 | Ruth et al. | 340/172.5 |
| 3,753,240 | 8/1973 | Merwin | 340/172.5 |

*Primary Examiner*—Raulfe B. Zache
*Attorney, Agent, or Firm*—Joseph E. Rusz; Julien L. Siegel

[57] ABSTRACT

An interface system for a PLATO IV computer terminal and random access slide projector that permits use of standard slides. The terminal keyboard selects a slide number which causes a strobe signal and binary signal representing the number to be transmitted to the interface. The number is latched in the interface upon reception of the strobe and then fed to a programmable read only memory (PROM) where the binary signal is algorithmically converted into a base 9 system. The output of the PROM is fed to decoders which convert the base 9 numbers into high and low order signals and are then fed to the slide projector after passing through inverter drivers and protective diodes. The interface also controls the ON/OFF position of the projector and generates an access signal to the projector after it has received the slide number in proper form.

4 Claims, 6 Drawing Figures

4,021,785

INTERFACE SYSTEM FOR A COMPUTER TERMINAL AND RANDOM ACCESS SLIDE PROJECTOR

STATEMENT OF GOVERNMENT INTEREST

The invention described herein may be manufactured and used by or for the Government for Governmental purposes without the payment of any royalty thereon.

BACKGROUND OF THE INVENTION

This invention relates to computer terminal control slide projectors, and more particularly to an interface between a PLATO IV terminal and a random access slide projector like the Kodak RA-960.

PLATO IV is a large-scale computer-assisted instruction system being implemented by the University of Illinois. The PLATO IV terminal contains a plasma display panel which was invented by Dr. Don Bitzer and others of the PLATO project. This panel is thin (about one-fourth inch) and adequately transparent so that images can be projected onto a rear projection screen placed at the rear of the panel. The PLATO IV terminal also contains a fiche projector and each fiche contains up to 256 images, each of which is 0.1 inch square. Any one of the 256 images can be randomly accessed under computer control and projected onto the rear of the plasma display.

The major problem experienced in the use of this internal fiche projector is that the fiche do not meet all standards for microform image size. Thus, there is a problem with availability of fiche generation equipment. Currently, the PLATO project has the only known camera system for efficient fiche production. This system uses 35 mm slides as the masters for the fiche and where after one has the 35 mm slides in hand, obtaining the fiche involves extra delay and cost without adding any advantages to the needed research and development.

The present invention is a solution to the problem by providing an interface to a radar access slide projector like the Kodak RA-960. The interface design entails no modifications to the projector or the computer terminal. No PLATO computer software slide-command changes are necessary, and the device is highly reliable.

SUMMARY OF THE INVENTION

The present invention interfaces a Kodak RA-960 type slide projector with a Magnavox PLATO IV computer terminal such that software-generated, digital, controlling signals pass from the central computer through the terminal's slide projector jack to the interface device. Necessary digital, analog, and algorithmic conversions are performed at the device and appropriate electrical, slide-selection signals are passed to the projector. The design is such that no modifications are required to the computer terminal, the slide projector, or to the PLATO IV software commands. The interface device has 2 integrated circuits, 71 discrete components, a 256 × 8 bit programmable read only memory and a −12 volt power supply.

In order for the computer to select a slide, a conversion must be made of both the digital and analog value of the computer data-word slide number. The projector's addressing/access mechanism is dependent upon a base 9 numbering system (e.g., slide no. $11_{(10)} = 1 \times 9° + 2 \times 9° =$ projector address no. $12_{(9)}$). The projector is not electrically compatible with the computer terminal's digital transistor-transistor logic (TTLO and necessary analog conversions are made with the slide selection signals. The necessary code conversion from binary to base 9 is performed by an electrically programmable FAMOS read only memory. The PROM's 2048 bit static memory is programmed such that the output is the correct algorithmic conversion of the binary input.

It is therefore an object of this invention to provide a method and system of computer controlled selection of slides for use in instructional technology.

It is another object to provide a system for using a PLATO IV terminal with standard slides and projectors.

It is still another object to provide a system for interfacing a slide projector with a computer terminal having a very high degree of reliability.

It is yet another object to provide a system for interfacing a random access slide projector with a PLATO IV computer terminal where the projector is not electrically compatible with the terminal's digital-transistor-logic.

These and other objects, features and advantages of the invention will become more apparent from the following description taken in conjunction with the illustrative embodiment in the accompanying drawings.

DETAILED DESCRIPTION OF THE PREFERRED EMBODIMENT

Figure 1:
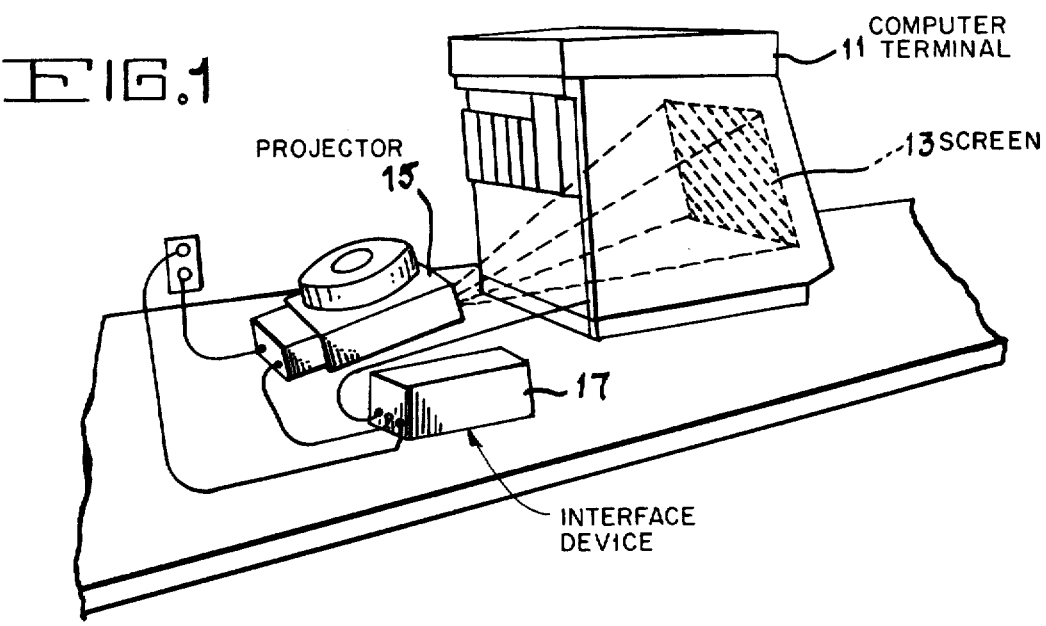
FIG. 1 is a pictorial showing the arrangement of the terminal, the interface, and the slide projector.

Referring to FIG. 1, there is shown a pictorial arrangement of the interface system with the accompanying components. PLATO IV computer terminal 11 includes screen 13 which can be projected upon by random access slide projector 15. Interface device 17 connects terminal 11 to projector 15 and provides the necessary conversions to make projector 15 responsive to commands from terminal 11.

Figure 2:
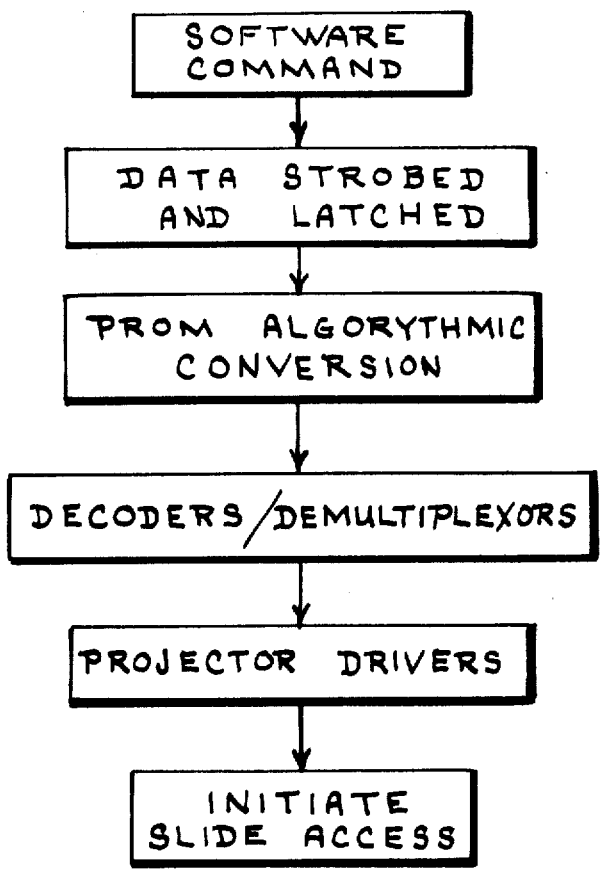
FIG. 2 is a basic functional block diagram of the invention.

Referring to FIG. 2, which shows the basic functional diagram of the system, it can be seen that a software command 1 from the terminal initiates the signal to the interface device. The signal is a digital representation in binary form of the slide address number and also includes a strobe which latches the number into the interface device. The address number is converted from a binary form to a base 9 form by a programmable read only memory (PROM). The base 9 number is then decoded into a series of driver lines. These lines have a transistor-transistor-logic (TTL) voltage level that is incompatible with the projector and is converted accordingly. After a proper delay, the interface device emits an initiate slide access signal to projector 15 which starts the projector's electro-mechanical search mode.

The PLATO IV TUTOR computer language has a software command called "SLIDE" with a tag designating the number of the slide to be shown, i.e., SLIDE n1. When executed at terminal 11, this command places the binary value of n1 at the terminal slide jack accompanied by a strobe (data ready) signal. This causes projector 15 to select an image, turn the lamp on, and display the desired slide.

Figure 3:
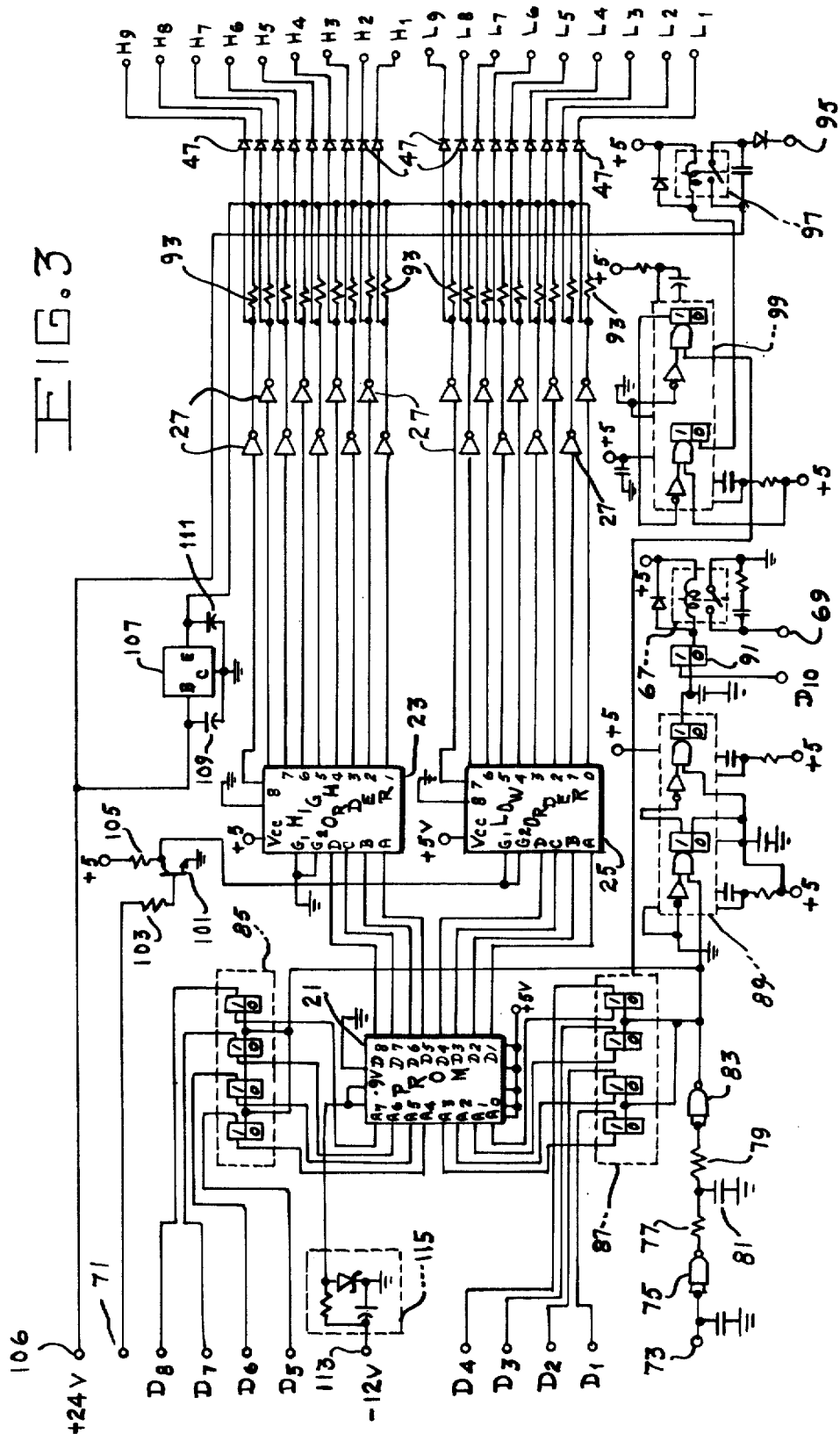
FIG. 3 is a schematic diagram of the interface system.

The binary number of the desired slide is latched into the interface device by the strobe signal provided by terminal 11. Once latched, this binary number serves as the input data word for programmable read only memory 21 (PROM), as shown in FIG. 3. PROM 21 allows conversion of this binary number to its equivalent base 9 value, since base 9 is required by a Kodak RA-960 projector or the like.

The new base 9 number then serves as the input address for the interface device high decoder/demultiplexor 23 and low order decoder/demultiplexor 25. Eighteen address lines (nine high order and nine low order) from decoders 23 and 25 are buffered through inverter drivers collectively designated as 27 and protective diodes collectively designated as 47 which are connected to projector 15 via high order lines H1–H9 and low order lines L1–L9.

During the entire slide selection process there are three critical timing sequences for successful operation and reliability. The lamp ON/OFF data line D10 from terminal 11 is delayed until the slide number data lines D1–D8 have settled and latched. Then ON/OFF data line D10 activates interface relay 67 which controls the ON/OFF operation of slide projector 15 at output line 69. When interface relay 67 turns projector 15 ON, as discussed above, a large quantity of electromechanical noise is created by its motors and relays. Another delay is created to allow this noise to decay, followed by an "initiate-access" signal that is sent to projector 15 at line 95 which causes it to seek out the appropriate slide position. During the search mode of projector 15, the high order digit (representing multiples of nine) of the slide number is sought first. Once the slide tray sector corresponding to this high order digit is found, projector 15 sends a "low order enable" signal back to the interface device at line 71. The interface device must not provide the low order digit (representing multiples of one) until the "low order enable" signal is received.

The random access slide selection process is initiated with a slide selection command accompanied by an arithmetic expression for the desired slide number as previously explained. To turn projector 15 OFF a new slide command is given with an expression whose value is greater than 511 and less than 1024.

As a student progresses through a lesson the computer software allows the student responses to be used for selecting an appropriate slide or slide sequence and for controlling the display duration.

When the SLIDE command is executed, a 10-bit binary value of the SLIDE variable is presented at the terminal output jack which is connected to lines D1–D10 and line D10. The first 8-bits, at D1 through D8, are for slide numbers 0 to 255. Bit 10 at D10 is for numbers between 511 and 1024 for control of the projector ON/OFF state. The "data ready" strobe from terminal 11 is inputted to line 73.

Figure 4:
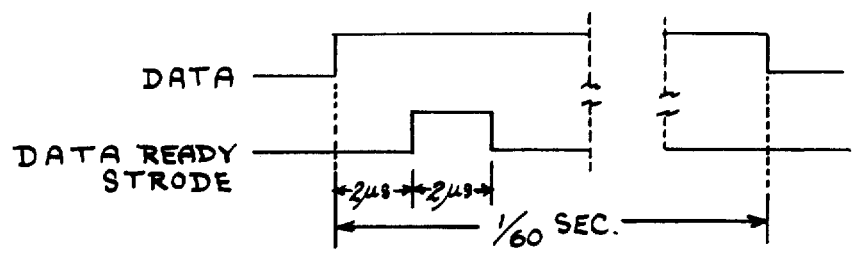
FIG. 4 is a timing diagram for the output of the terminal.

The slide data appears on lines D1–D8 and D10 for 16.6 milliseconds. Two microseconds after the data appears the data ready strobe appears and lasts for 2 microseconds. The timing diagram of FIG. 4 shows the relationship of the signals from the output jack of terminal 11 which include the slide number data on lines D1–D8 and the data ready strobe on line 73.

When the interface device receives the strobe signal from terminal 11 on line 73 it reconditions the waveform of the signal by passing it through NAND gate inverter 75, an RC ramp filter including resistors 77 and 79 and capacitor 81 and a second NAND gate inverter 83. This conditioning filters out high frequency pulses created by external noise and eliminates false clocking of the interface latches 85 and 87 that are fed by the slide numbers on lines D1–D8. This reshaped strobe signal is the clock strobe for two 4-bit D latches 85 and 87 which can be of the Ser. No. 7475 type. Latches 85 and 87 capture the binary slide number as the reshaped clock signal transitions to its low state. After being present for a total of 4 microseconds, data lines D1–D8 are latched onto the interface board, but D10, the projector ON/OFF signal, has not yet been processed.

Figure 5:
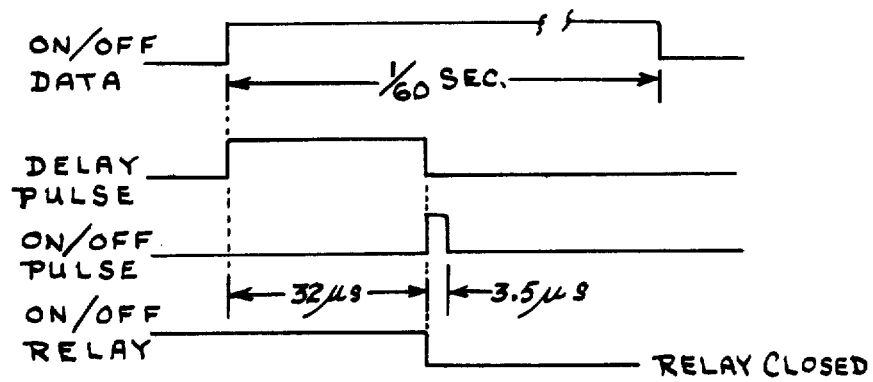
FIG. 5 is a timing diagram for the ON/OFF relay of the projector.

After the binary slide number data has been latched, D10 is still present. When the reshaped data read strobe triggers the slide number latching, it also triggers 20 microsecond one-shot delay pulse included in circuit 89. This delay is created to insure that the ON/OFF operation of projector 15 occurs only after the address data is securely latched. After this delay, a second one-shot also included in circuit 89 is fired to produce a pulse which latches the ON/OFF data on line D10 into binary circuit 91. This second pulse is very short (3.5 microseconds) to insure a secure latching before the slide projector relay turns on. The timing diagram for these sequences is shown in FIG. 5.

After the desired ON/OFF state is latched into binary circuit 91, interface relay 67 which controls the ON/OFF state of slide projector 15, has a renewed status. When the $\overline{Q}$ output (normal 0) of binary circuit 91 is low (logic 0) it sinks current from the coil of relay 67; this energizes relay 67, closes its contacts, and turns slide projector 15 ON. When $\overline{Q}$ is high (logic 1) no current passes through relay 67, the contacts are open, and projector 15 is OFF. Thus projector 15 turns ON or OFF as $\overline{Q}$ goes low or high, respectively, and this action is based upon the delayed input signal at D10.

At this point, the latched address data is an 8-bit binary value of the desired slide. The electromechanical addressing mechanism of a projector, like the Kodak RA-960, uses a base 9 numbering system. As the slide tray rotates, wipers contact encoded addresses at each position. The addresses are encoded based on counting by nines, i.e., 0, 1, 2, 3, . . . 7, 8, 10, 11, 12 . . . 18, 20, 21 . . . .

To convert the binary (base 2) to a base 9 number, a programmable read only memory (PROM) 21 such as an Intel C1702A can be used. PROM 21 is arranged in an 8-bit per word by 256 word matrix. An 8 bit address is used to select one of the 256 words ($2^8 = 256$). PROM 21 is a static system in which the output follows the input with no clocking or read/write control signals necessary. After D1–D8 are latched, they become the 8-bit binary input address for PROM 21, and its output is the 8-bit base 9 number used by projector 15.

It should be noted that the hardware of a PLATO terminal is designed for up to 256 fiche images. PROM 21 is programmed to accommodate 256 slide number conversions but an RA-960 projector tray has only 81 slide positions. As such, a slide 82 command will cause the projector to display slide $\phi$. Of course, the interface device can be used in conjuction with several slide trays.

It is necessary to decode the base 9 slide number into 18 address/driver lines for projector 15. These are divided into nine high order lines for the multiples of nine and nine low order lines for the multiples of one. The 8-bit output of PROM 21 has the higher 4-bits coded for the high order and are fed to decoder/demultiplexer 23 and the lower 4-bits coded for the low order and are fed to decoder/demultiplexer 25.

Decoders/demultiplexers 23 and 25 can be Ser. No. 74154 integrated circuits which have a 4-bit input and a 16-line output. As will be explained below, the Ser No. 74154 is preferred as opposed to an Ser No. 7442 even through only nine of the 16 lines are used.

There are now 18 address lines with the proper address pattern available to projector 15. These lines, however, have transistor-transistor-logic (TTL) 5 volt levels which are incompatible with the control signal voltage levels required by projector 15. Hex inverter buffers/drivers 27 such as Ser. NO. 7406 are used with open collector high-voltage outputs to provide the voltage conversion required.

The open-collector outputs of buffers 27 are tied to a 15 volt supply through 2,200 ohm pull-up resistors collectively designated as 93. These buffer outputs provide the proper biasing signals across protective diodes 47. In operation, 16 of the 18 open collector buffer outputs should be low and the remaining two outputs, one for each set of nine lines, should be high, to drive projector 15.

Diodes 47 are required to protect inverters 27. The internal addressing mechanism of projector 15 causes one address line to be shorted to an adjacent line. This shorting causes the high voltage signal of one line to appear on another line. The diode prevents this signal from reaching and harming the driver. There is a manually operated switch at the back of projector 15 for switching from the automatic random selection mode to the tray release mode. Thus when the switch is set for tray release mode, the address lines for zero are set high. This also causes the rotation and the shorting process described above.

Now that the address lines are properly set for projector 15, an initiate access signal can be sent to it at line 95 through single pole, single throw relay 97. When closed, relay 97 energizes a double pole, single throw relay inside projector 15 that controls the projector lamp and motor.

Figure 6:
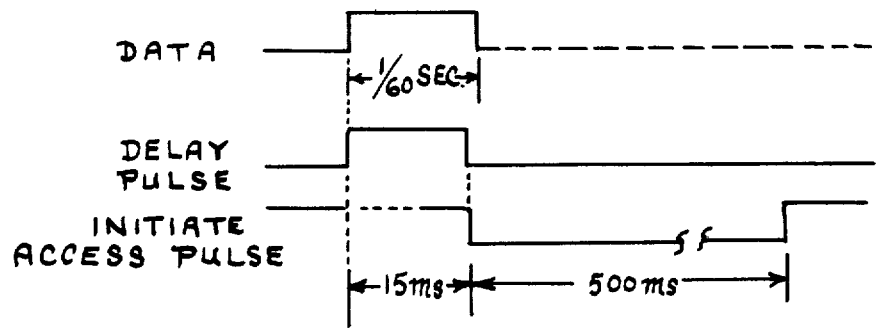
FIG. 6 is the timing diagram for the initiate access pulse to the projector.

Relay 97 is controlled by delay circuit 99, which can be an Ser. No. 74123. While the slide command data is being latched, converted, decoded and buffered, a 15 millisecond pause is incurred by circuit 99. This allows all the necessary operations to occur and allow the address lines to settle after projector 15 has been turned ON. After 15 milliseconds the second half of circuit 99 fired and its $\overline{Q}$ output turns relay 97 ON for 500 milliseconds. This provides the necessary initiate access pulse to the projector. The timing diagram for the initiate access pulse to projector 15 is shown in FIG. 6. Slide projector 15 now starts its electromechanical search mode, rotating in the shortest direction to the requested slide.

When projector 15 starts its rotation, it first seeks that segment of the tray that represents the nine's order of the addressed slide. For successful operation, it is necessary that at this time only one high order address line from the interface device to projector 15 be high while all nine low order lines are low. Thus the high order decoder 23 must be enabled while low order decoder 25 is disabled during the high order search mode.

Once the tray has rotated to the correct nine's sector, projector 15 sends a "low order enable" signal to the interface device at line 71 which enables decoder 25 for the low order search. Since the low order enable signal is not TTL compatible, it is conditioned prior to arriving at low order decoder 25 by switching transistor 101 and resistors 103 and 105 The collector output of transistor 101 provides the necessary voltages for TTL input conditions of 1 and 0.

It might be more efficient to use an SN7442 decoder with 10 decoded outputs, especially since only nine are used. However, the Ser. No. 4154 is preferred since it is the only decoder with an enable/disable G input and because of the high and then low order search sequence, this enable/disable input is needed. When enabled, the 4-bit binary input is decoded into 16 mutually exclusive outputs with one active low. When disabled, the 16 output lines are inactive high.

At the end of the access operation, the high order and the low order search have been completed, the correct slide is dropped from the tray for viewing, and the automatic focus adjusts the focal length for proper viewing.

For operation of the interface device, three voltages supplied are necessary, +5, +15, and −9. The 5-volt supply is necessary for the TTL circuits and is available from the terminal's power supply at the slide connector jack which include lines 23, D1–D8, and D10. The terminal's 5-volt supply is sufficient to supply current for both the interface device and the terminal.

The design for the Ser. No. 7406 open collector drivers 93 requires a 15-volt supply. A 24 VDC source is obtained from projector 15 at line 106 and dropped to 15 volts by regulator 107 and capacitors 109 and 111. The regulator voltage drop from about 24 to 15 volts requires proper heat-sinking to protect the regulator by dissipating the power loss.

The third voltage, −9 volts, is required for Intel PROM 21. The terminal has a −12 volt supply available at the card rack wiring plane. The interface also provides a −12 volt supply at line 113 which is converted on the board to −9 volts. If the interface printed circuit board is plugged directly into the card rack of the terminal, no separate power supply is required. Since the parts cost for the −12 to −9 volt conversion is minimal by using 9 volt Zener diode circuit 115, it is preferred to use a −12 volt (instead of −9 volt) power supply inside the interface so that one board design would suffice for use in either the terminal card rack or in the interface.

The present invention offers ultra-high reliability. As described earlier, a small delay is created after latching the data to allow the circuitry to settle down from injected violent electrical noise created by turning projector 15 on. The data ready strobe from projector 15 to the interface board undergoes a reshaping process to eliminate any sharp noise spikes which would cause false clocking. All integrated circuits in the strobe chain of events have bypass capacitors (0.005 microfarads). These include NAND gates 75 and 82, delay circuit 89, binary circuit 91, and delay circuit 99. Relay 67 has an RC circuit across its contacts to suppress arcing and both relays utilize diodes across their coils to suppress inductively caused voltage spikes. All comonents used have intrinsically high levels of reliability, and all components operate well within their ratings.

An acceptance test of the terminal, interface and projector was administered for over 5,000 slide projector operations using PLATO TUTOR software. The result was that no failures were experienced by either the projector or interface device and that the only errors that occurred were attributable to the 1,000 mile data link to the central computer. These results are considered to exceed the highest requirements for classroom use.

What is claimed is:

1. An interface system between a random access slide projector and a computer terminal, the terminal transmitting a data ready strobe and slide selection numbers in the form of a plurality of binary bits to the interface system, the interface system comprising:
   a. means for latching the binary slide selection numbers, the latching means being activated by the strobe;
   b. means for converting the latched binary numbers into a plurality of bits of a base 9 system;
   c. means for decoding the outputs of the converting means into a plurality of high order signals representing multiples of nine and a plurality of low order signals representing multiples of nine;
   d. a plurality of inverter drivers fed by one each of the high order and low order signals from the decoding means; and
   e. a plurality of diodes connected to one each of the plurality of the inverter drivers.

2. An interface system according to claim 1 which further comprises:
   a. a first delay circuit fed by the strobe; and
   b. a first relay connected to the first delay circuit, the activation thereof causing the projector to be in the ON state.

3. An interface system according to claim 2 which further comprises means for activating the electromechanical search mode of the projector, the activating means including:
   a. a second delay circuit fed by the strobe; and
   b. a second relay circuit connected to the second delay circuit.

4. An interface system according to claim 3 wherein the converting means includes a programmable read only memory.

* * * * *